Oct. 2, 1951 P. KOLLSMAN 2,569,997
JET DEVICE FOR DISCHARGING A MIXTURE OF FLUIDS
Filed Jan. 4, 1946 3 Sheets-Sheet 1
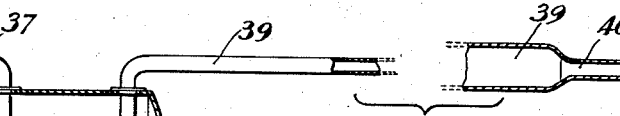
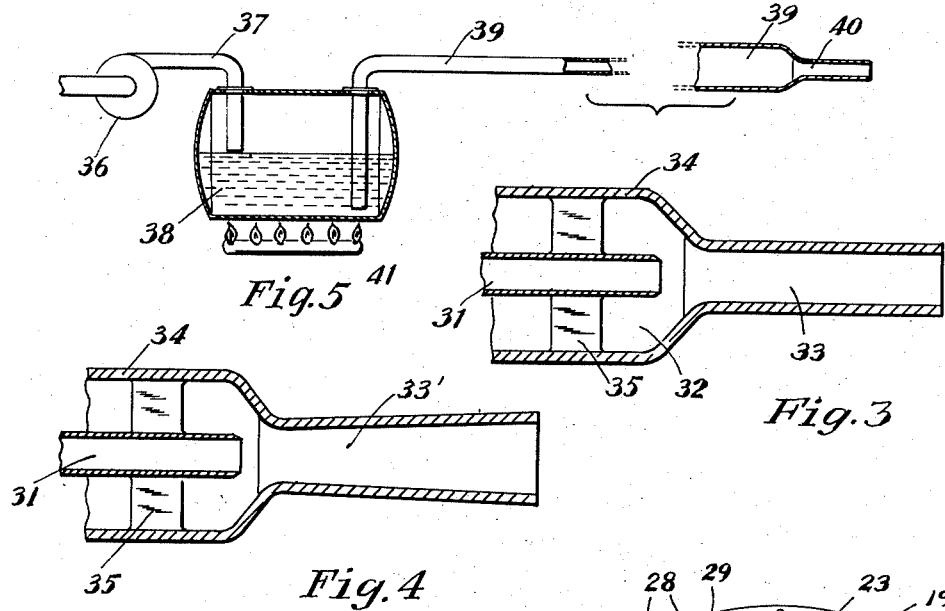
INVENTOR.
PAUL KOLLSMAN
BY
Albert M. Austin
his ATTORNEY Oct. 2, 1951 — P. KOLLSMAN — 2,569,997
JET DEVICE FOR DISCHARGING A MIXTURE OF FLUIDS
Filed Jan. 4, 1946 — 3 Sheets-Sheet 2

INVENTOR.
PAUL KOLLSMAN
BY
Albert M. Austin
his ATTORNEY

Patented Oct. 2, 1951

2,569,997

UNITED STATES PATENT OFFICE 2,569,997

JET DEVICE FOR DISCHARGING A MIXTURE OF FLUIDS

Paul Kollsman, New York, N. Y.

Application January 4, 1946, Serial No. 638,951

5 Claims. (Cl. 60—40)

This invention provides a method of and apparatus for producing reactive thrust by the ejection from a nozzle or orifice of a jet of pressure fluid at a substantial discharge velocity. The invention has particular application to devices for furnishing motive power by direct reactive thrust, exerted for example, by jets of pressure fluid discharged from the vehicle into the surrounding medium, and has also application to prime movers operating on the thrust principle such as reaction turbines.

The invention provides a method of operating reaction devices efficiently and provides further various forms of thrust devices, particularly designed and adapted for practicing the method embodying the invention.

Thrust devices attain their greatest efficiency if the jet of pressure fluid ejected from the nozzle or orifice is discharged at a fluid velocity substantially equal to, or slightly greater than, the rate of relative speed between the nozzle and the surrounding medium. If the velocity of the pressure fluid jet is substantially greater than the rate of travel of the nozzle relative to the surrounding medium, a loss is incurred known generally as the loss due to slip.

Compressible pressure fluids such as, for example, dry steam, have discharge velocities considerably greater than the velocity at which the discharge nozzle travels and for this reason inherently operate at less than maximum efficiency.

According to the invention I discharge a mixture of compressible and non-compressible pressure fluid which has a discharge velocity considerably below the discharge velocity of compressible pressure fluid. The mixture of compressible and non-compressible pressure fluid will sometimes be referred to as foam and may be produced in various ways, for example, by mixing compressible and non-compressible pressure fluid at a suitable point or zone before the point of discharge or may be produced by the discharge of water heated under pressure to a temperature considerably above the boiling point of 100 degrees centigrade whereby the water is caused to turn into a foam consisting of liquid water and steam bubbles at the discharge nozzle where a sudden pressure drop occurs while simultaneously greatly increasing its volume.

The invention is also applicable to, and offers particular advantages in connection with, engines operating on an impulse, as distinguished from a reaction, principle such as turbines in which jets of pressure fluid impact upon the blades of a driven rotor.

The various objects, features and advantages of this invention will appear more fully from the detailed description which follows accompanied by drawings illustrating how the present invention may be practiced and showing a preferred embodiment of a machine for practicing the invention and elements for use in the machine.

The invention also consists in certain new and original features of construction and combination of parts hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part thereof in which:

Fig. 1 is a side view partly in section of a reaction turbine embodying the invention;

Fig. 2 is a fragmentary section of the turbine of Fig. 1, the section being taken on line 2—2 of Fig. 1;

Fig. 3 is a sectional side view through a nozzle for use in practicing the present invention;

Fig. 4 is a sectional side view of a modified form of nozzle;

Fig. 5 is a diagrammatic illustration of a device for producing a power jet according to the invention;

Figure 6:
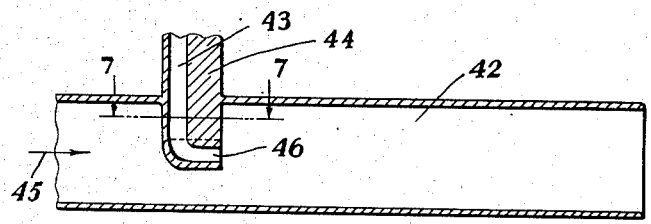
Fig. 6 is a sectional side view of a nozzle for practicing the invention.

In the following description and in the claims various details will be identified by specific names for convenience. The names, however, are intended to be as generic in their application as the art will permit. Like reference characters refer to like parts in the several figures of the drawings.

In the drawings accompanying, and forming part of, this specification, certain specific disclosure of the invention is made for the purpose of explanation of broader aspects of the invention, and the invention is illustrated by specific reference to a reaction turbine. It is understood, however, that the invention is applicable to devices and turbines operating on the impulse principle, for example, turbines in which jets from stationary nozzles impact blades or vanes of a rotor. It is also understood that the details may be modified in various respects without departure from the principles of the invention and that the invention may be applied to other structures than the ones shown.

The turbine illustrated in Fig. 1 comprises a casing 11 mounted on a base 12. A hollow rotor 13 is mounted on a drive shaft 14 supported in bearings 15 in the base. A gasket or packing 16 seals the interior 17 of the casing against the bearings 15.

The rotor 13 is hollow and contains substantially radial passages 18 leading to reaction nozzles 19 near the periphery or point of greatest diameter of the rotor. Fluid may enter the interior 17 of the rotor 13 through a central aperture 20.

A separate central duct 21 in the rotor 13 leads to substantially radial ducts 22 terminating at nozzles 23 so directed as to discharge jets of fluid supplied through the ducts 21 and 22 into the reaction nozzles 19 proper.

Fluid is supplied to the central duct 21 through a pipe 24 leading into a hub portion 25 of the casing 11 into which the central duct extends. A hub gasket 26 seals the rotatable central duct 21 against the stationary casing 11.

The interior 17 of the casing 11 is subdivided into a main chamber 27 in which the rotor 13 is free to spin and a plurality of substantially radially extending return passages 28 extending from points near the periphery of the rotor towards the central aperture 20 of the rotor to return liquid discharged from the rotor towards the central aperture 20. Each radial passage 28 is preferably provided with a vane or blade 29 at the peripheral end for catching liquid discharged from the reaction nozzle 19.

The operation of the device illustrated in Figs. 1 and 2 is substantially as follows:

The casing 11 is filled with a charge of non-compressible fluid which may be water or a heavy liquid such as mercury. The turbine is started either by supplying compressible pressure fluid, for example, compressed air or steam to the nozzles 23 from a suitable source (not shown) through the pipe 24 causing the rotor 13 to spin like an ordinary aeolipile. Alternatively the rotor 13 may be set in motion by rotary power applied to the drive shaft 14. In either event non-compressible liquid is forced towards the outer end of the radial passages 18 of the hollow rotor by centrifugal force building up pressure at the reaction nozzles 19, the pressure being the greater, the greater the rate of rotation of the rotor.

Assuming the rotor has been set in motion by rotary power applied at the drive shaft 14 from the outside during a period during which the supply of compressible fluid was shut off, the drive is then discontinued and compressible fluid under pressure is admitted to the nozzles 23 through passages 24, 21 and 22. The compressible fluid is discharged from the nozzles 23, mixes with the heavier non-compressible liquid at the ends of the radial passages 18 and issues as a powerful jet from the reaction nozzles 19. The reaction jet consists of a mixture of compressible fluid and non-compressible fluid and is in this description sometimes referred to as foam. The jet of foam has a discharge velocity substantially greater than the discharge velocity of non-compressible fluid but considerably less than the discharge velocity of compressible fluid, such as steam of equal pressure.

The heavier non-compressible constituents of a jet of foam enter the radial return passages 28 and return towards the central aperture 20 of the rotor whence the non-compressible fluid is automatically fed into the radial passages 18 of the rotor acting like a centrifugal pump. Two columns of non-compressible pressure fluid form in the passages 18, the pressure in each column increasing greatly towards the reaction nozzle by reason of the centrifugal force acting on each column.

The compressible constituent of the reaction jets escapes from the casing 11 through an exhaust port 30 to a suitable point of disposal, for example, into the atmosphere.

The turbine may likewise be set in operation by discharge of compressible pressure fluid through nozzles 23 and 19 causing the rotor to spin. The rotation of the rotor automatically causes non-compressible fluid to be supplied to the reaction nozzles where then a mixing of the compressible and the non-compressible fluid occurs prior to discharge in the form of a jet of mixture.

The device is self-regulating both as to speed and mixture ratio. If the speed of the rotor is below the normal speed of the turbine, the pressure of the non-compressible fluid at the reaction nozzles 19 is too low and an excessive amount of compressible fluid escapes from the nozzles 23 causing an increase in the speed of the rotor and an increase in the pressure of the non-compressible fluid. If, on the other hand, the speed of the rotor tends to become too high, the pressure of the non-compressible fluid increases at the nozzles 23 reducing the discharge of compressible fluid therefrom resulting in a reduction of the power of the jet discharged from the nozzle 19 and a corresponding decrease in speed.

Figs. 3 and 4 illustrate two different forms which the reaction nozzles for the turbine may assume. The nozzles are also suited for use in devices operating on the impulse, as distinguished from the reaction, principle. The nozzle shown in Fig. 3 comprises a centrally located duct 31 for supplying compressible fluid and is surrounded by a chamber or space 32 of annular cross section through which non-compressible fluid is supplied. Compressible and non-compressible fluids mix and then pass through a substantially cylindrical portion 33, which constitutes a discharge nozzle proper. In the illustrated embodiment the central duct 31 and the outer wall 34 of the nozzle are spaced by suitable spacers or fins 35.

Fig. 4 shows a modified form of nozzle corresponding in all major details to the nozzle just described and illustrated in Fig. 3, the only difference being that the discharge nozzle proper 33' is slightly tapered. This type of nozzle is advantageous where it is desired to permit more rapid expansion of the bubbles of compressible fluid in the jet relatively to the length of the nozzle.

A jet of foam may be produced in other ways than by mixing of compressible and non-compressible fluid. Fig. 5 illustrates diagrammatically an installation in which a mixture of liquid water and steam is employed. Water is fed by a pump 36 through a supply duct 37 into a boiler 38. A discharge duct 39 leads to the nozzle 40 proper.

The water in the boiler 38 is heated by a heater 41 to a temperature substantially above 100 degrees centigrade while sufficient pressure is being maintained in the boiler 38 to prevent formation of steam. The heated water under prssure is supplied to the nozzle 40 through which it is discharged in the form of a jet. The discharge duct 39 is of relatively large diameter to maintain the rate of flow low and decreases in cross section at the nozzle 40 to bring about a substantial increase in the rate of flow of the water at the point of discharge.

The pressure inside the discharge duct 39 is equal to the pressure in the boiler 38 and is of the order of several hundred pounds per square inch. At the end of the nozzle the pressure drops to substantially atmospheric pressure. The sudden and great drop in pressure causes the heated water to burst partially into steam resulting in a jet discharged from the nozzle consisting of a mixture of non-compressible fluid, water, and compressible fluid, steam.

Nozzles for mixing compressible fluid with non-compressible fluid may assume various forms depending on the types of fluids used, the pressures employed and the specific use.

Figure 7:
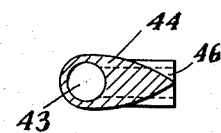
Fig. 7 is a section taken on line 7—7 of Fig. 6.

Figs. 6 and 7 illustrate a nozzle comprising a cylindrical portion 42 into which a duct 43 in a housing 44 extends. The housing is shaped to provide a minimum of flow resistance as shown more particularly in Fig. 7. Non-compressible pressure fluid is supplied into the cylindrical portion of the nozzle in the direction indicated by arrow 45. Compressible fluid is supplied through the duct 43 and enters into the stream of non-compressible fluid at the port 46 at the end of the duct 43.

Figure 8:
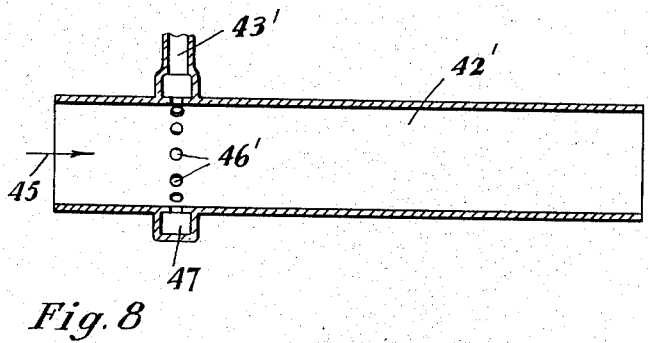
Figs. 8 to 10 are modified forms of nozzles for practicing the invention.

The nozzle illustrated in Fig. 8 comprises a cylindrical portion 42'. Compressible fluid enters through a duct 43' leading to an annular chamber 47 and passes into the interior of the cylindrical portion 42' through a plurality of ports 46' to mix with non-compressible fluid entering in the direction of the arrow 45.

Figure 9:
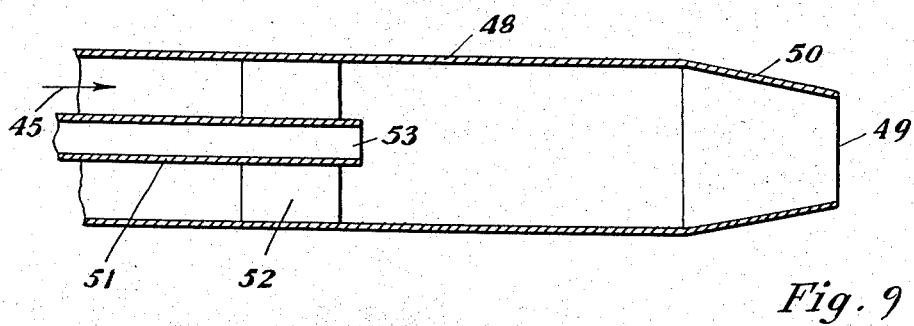

The nozzle illustrated in Fig. 9 comprises a cylindrical portion 48 of relatively large diameter leading to a discharge port 49 at the end of a tapered portion 50. A substantially centrally located duct 51 is held in the cylindrical portion 48 by fins or spaces 52. Non-compressible fluid is supplied in the direction of the arrow 45 and flows at a relatively slow rate by reason of the large cross section of the cylindrical portion. Compressible fluid is supplied through the central duct 51 and passes into the surrounding flow of non-compressible fluid at the port 53 at the end of the duct 51. Mixing of the two fluids takes place in the cylindrical portion. The rate of flow of the mixture is accelerated by the tapered portion 50, the jet of mixture leaving the nozzle at 49. Since the tapered portion 50 is relatively short, energy losses due to wall friction of the rapidly flowing fluid are relatively low. Frictional losses are maintained low in the cylindrical portion 48 due to the reduced rate of flow in the cylindrical portion of large diameter.

Figure 10:
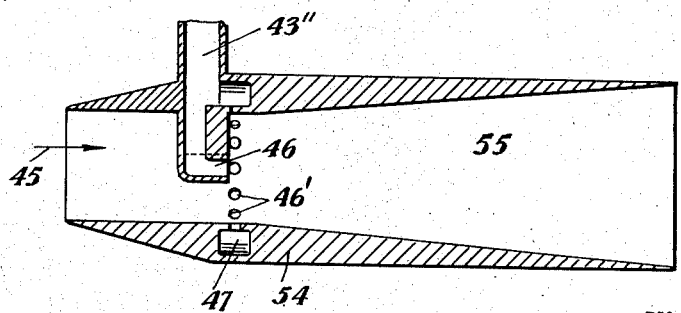

The nozzle illustrated in Fig. 10 is particularly adapted as a propulsion unit for boats. Water enters the nozzle in the direction of the arrow 45. Compressible fluid enters through a duct 43" leading both to a central port 46 and a plurality of ports 46' in the walls of the nozzle housing 54. The ports 46' are supplied with compressible fluid from an annular chamber 47 communicating with the duct 43". Water and the compressible fluid leave the nozzle through a tapered passage 55.

Figure 11:
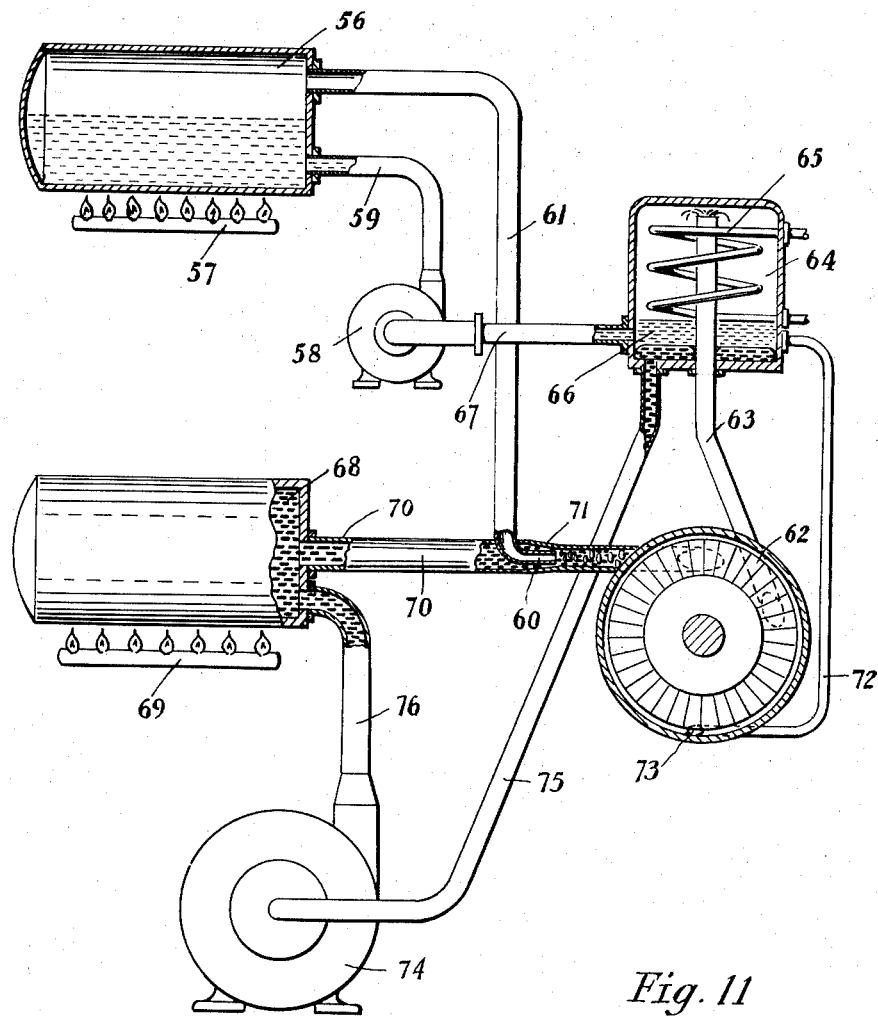
Fig. 11 is a diagrammatic illustration of a jet operated system providing for addition of heat to the expanding compressible fluid.

Expansion of the bubbles of compressible pressure fluid in the surrounding mass of non-compressible fluid tends to lower the temperature of the mixture due to the fact that expansion of a fluid causes withdrawal of heat from the surrounding medium. Most advantageous operating conditions are obtained where the temperature is maintained substantially constant or is even raised. The present invention lends itself admirably to operation under such advantageous conditions and permits addition of heat to the fluid at the proper point to insure substantially isothermal expansion of the compressible fluid. An installation providing for addition of heat to the compressible fluid is diagrammatically illustrated in Fig. 11.

A storage tank or boiler 56 heated by a suitable heater 57 is supplied with appropriate fluid, for example water, by a pump 58 through a supply duct 59. The fluid is converted into gaseous form by the addition of heat and is led to a nozzle 60 by a duct 61. The jet of fluid from the nozzle 60 is directed into a turbine 62 whence a return duct 63 leads to a condenser 64 having suitable cooling means 65. The condensed pressure fluid 66 is then returned to the pump 58 through a duct 67.

A further storage tank 68 is provided for non-compressible fluid, for example mercury, also heated by an appropriate heater 69. The heated non-compressible fluid is conducted through a duct 70 to a ring shaped outer nozzle 71 surrounding the nozzle 60. Mixing of the non-compressible fluid with the compressible fluid takes place at the nozzles 60 and 71. The jet of mixture impinges the rotor of the turbine 62 as previously mentioned and the non-compressible fluid returns through a return duct 72 to the pool of non-compressible fluid in the condenser 64. The non-compressible fluid is supplied from the condenser to a pump 74 through a duct 75 and fed under pressure through a further duct 76 into the storage tank 68.

It will be understood that for the sake of clearness various elements of the installation are shown at different levels while in actual practice they are differently arranged. For example, the condenser is preferably at the same or a lower level as the outlet port 73 of the turbine for the non-compressible fluid, in an actual installation.

The operation of the device is substantially as follows: Compressible and non-compressible fluid are supplied to the nozzles 60 and 71 where a jet of mixture is formed directed into the turbine. The bubbles of the compressible fluid which tend to expand and withdraw heat from the surrounding non-compressible fluid are provided with additional heat by the non-compressible fluid heated in the tank 68.

Evidently the system lends itself admirably to operation under other conditions, for example, the entire heat may be supplied by the non-compressible fluid and a jet of liquid may be injected into the flow of non-compressible fluid, the liquid being immediately heated by the surrounding non-compressible fluid to develop compressible fluid whereby again a jet of a mixture of non-compressible and compressible fluid is produced. In the latter case a heater 57 for the liquid may be dispensed with. Such modification will be obvious to persons skilled in the art.

The invention thus provides a method and means for producing power, both rotative and translatory, by jets emitted from nozzles. The invention offers the advantage that the jets produced according to the invention are emitted at manageable speeds in distinction from the conventional steam jets where the rates of flow are so high as to be disadvantageous.

The invention has application to engines for producing rotary power, for example in impulse and reaction turbines and is also suited for producing translatory motive power, for example for propelling boats through water.

Obviously the present invention is not restricted to the particular embodiments herein shown and described.

It is also not necessary for the production of a jet of compressible and non-compressible fluid to mix the two constituents in their ultimate state, for example a heated non-compressible fluid may be supplied to the nozzle and water in drops or in a thin stream injected into the non-compressible fluid whereby bubbles of steam are formed in the nozzle due to the heating of the injected water charge by the heated non-compressible fluid which envelops it. The result is again a jet comprising the non-compressible liquid, for example mercury and steam intimately mixed therewith. The nozzles shown in Figs. 3, 4, 6, 8 and 9 and the device of Fig. 11 lend themselves to this modification.

The invention may be embodied in other devices than the ones shown and various additions, omissions, substitutions and modifications may be made without departure from the general teaching of the principle of the invention.

What is claimed is:

1. A jet device for discharging a mixture of fluids under pressure, the device comprising a first duct having a conduit portion and a nozzle portion narrower than the conduit portion; a second duct terminating within said conduit portion short of the entrance of said nozzle portion for discharging fluid from said second duct into said conduit portion substantially in the direction of the nozzle portion; means for supporting said first and said second duct for rotation about an axis with said nozzle portion extending in a substantially tangential direction and said conduit portion extending in a substantially radial direction; means for feeding a compressible fluid under pressure through said second duct; a volume of non-compressible fluid; and means for supplying said non-compressible fluid into said first duct adjacent the axis of rotation, whereby pressure will be built up in the non-compressible fluid in said first duct by centrifugal force, said pressure being effective to control the discharge of compressible fluid from said second duct.

2. A reaction turbine comprising in combination, a rotor; a substantially radially extending duct in said rotor for conducting fluid through said rotor; a volume of non-compressible fluid; means for supplying said non-compressible fluid to said rotor duct adjacent the rotor axis; means for supplying compressible fluid under pressure to said rotor; a first nozzle on said rotor narrower than said duct for discharging said non-compressible fluid from said duct in a direction to spin the rotor by reaction, said nozzle being at a greater radial distance from the rotor axis than the point of intake of non-compressible fluid into said duct; and a second nozzle for injecting said compressible fluid into said duct at a point immediately before the entrance of said first nozzle, the pressure built up in said duct by centrifugal force being effective in controlling the discharge of compressible fluid from said second nozzle.

3. A reaction turbine comprising, in combination, a rotor providing a substantially radial passage for fluid therethrough; a reaction nozzle at the end of said passage and narrower than said passage for discharging fluid from said rotor in a direction to spin the rotor by reaction; means for admitting non-compressible fluid into said rotor passage at a point closer to the rotor axis than said nozzle; a second nozzle for discharging fluid into said passage at a point immediately before the entrance of said reaction nozzle and substantially in the direction of said reaction nozzle; means for supplying compressible fluid under pressure to said second nozzle; and means for discharging spent compressible pressure fluid from said casing, the pressure built up in said passage by centrifugal force being effective to control the discharge of compressible fluid from said second nozzle.

4. A reaction turbine comprising, in combination, a casing; a rotor mounted in said casing for rotation about an axis, said rotor having a substantially radial passage for fluid therein; a volume of non-compressible fluid; means for admitting said non-compressible fluid into said rotor passage near the rotor axis; a reaction nozzle at the end of said passage and narrower than said passage for discharging fluid from said passage in a direction to spin the rotor about its axis by reaction; a second nozzle for discharging fluid into said passage at a point immediately before the entrance of said reaction nozzle and substantially in the direction of said reaction nozzle to inject compressible fluid from said second nozzle into the non-compressible fluid present in said passage prior to passage of the non-compressible fluid into and through the reaction nozzle; means for supplying compressible fluid under pressure to said second nozzle; and means for discharging spent compressible fluid from said casing, the pressure built up in said passage by centrifugal force being effective to control the discharge of compressible fluid from said second nozzle.

5. A reaction turbine comprising, in combination, a casing; a rotor mounted in said casing for rotation about an axis, said rotor having a substantially radial passage for fluid therein; means for admitting non-compressible fluid into said rotor passage near the rotor axis; a reaction nozzle at the end of said passage and narrower than said passage for discharging fluid from said passage in a direction to spin the rotor about its axis by reaction; a second nozzle for discharging fluid into said passage at a point immediately before the entrance of said reaction nozzle and substantially in the direction of said reaction nozzle to inject compressible fluid from said second nozzle into the non-compressible fluid present in said passage prior to passage of the non-compressible fluid into and through the reaction nozzle; means for supplying compressible fluid under pressure to said second nozzle; passages in said casing for returning non-compressible fluid discharged by said reaction nozzle towards the rotor axis; and means for discharging spent compressible fluid from said casing, the pressure built up in said passage by centrifugal force being effective to control the discharge of compressible fluid from said second nozzle.

PAUL KOLLSMAN.

REFERENCES CITED

The following references are of record in the file of this patent:

UNITED STATES PATENTS

| Number | Name | Date |
|---|---|---|
| 3,943 | Black | Mar. 12, 1845 |
| 593,219 | House | Nov. 9, 1897 |
| 857,965 | Smith | June 25, 1907 |
| 876,860 | Cromer | Jan. 14, 1908 |
| 884,417 | Rateau | Apr. 14, 1908 |
| 991,074 | Maclean | May 2, 1911 |
| 1,050,410 | Wainwright | Jan. 14, 1913 |
| 2,151,949 | Turner | Mar. 28, 1939 |

FOREIGN PATENTS

| Number | Country | Date |
|---|---|---|
| 5,970 | Great Britain | Mar. 30, 1900 |
| 29,508 | Great Britain | Dec. 13, 1897 |
| 382,027 | France | Nov. 28, 1907 |